(12) United States Patent
Hagiwara

(10) Patent No.: US 12,341,166 B2
(45) Date of Patent: Jun. 24, 2025

(54) SEPARATION AND EXTRACTION METHOD AND BATTERY IMMERSION MIXTURE

(71) Applicant: SUBARU CORPORATION, Tokyo (JP)

(72) Inventor: Yukihiro Hagiwara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1040 days.

(21) Appl. No.: 17/060,388

(22) Filed: Oct. 1, 2020

(65) Prior Publication Data

US 2021/0167435 A1 Jun. 3, 2021

(30) Foreign Application Priority Data

Nov. 28, 2019 (JP) ................... 2019-215409

(51) Int. Cl.
*H01M 10/54* (2006.01)
*B09B 3/80* (2022.01)
*C01G 53/42* (2025.01)
*H01M 10/0525* (2010.01)
*H01M 12/08* (2006.01)

(52) U.S. Cl.
CPC ............. *H01M 10/54* (2013.01); *B09B 3/80* (2022.01); *C01G 53/42* (2013.01); *H01M 10/0525* (2013.01); *H01M 12/08* (2013.01)

(58) Field of Classification Search
CPC .. H01M 10/54; H01M 10/0525; H01M 12/08; B09B 3/80; C01G 53/42
USPC ........................................................ 423/150.1
See application file for complete search history.

(56) References Cited

FOREIGN PATENT DOCUMENTS

| CN | 101172677 A | * | 5/2008 |
| JP | H02-0022874 A | | 1/1990 |
| JP | 2010-075880 A | | 4/2010 |
| JP | 2012-035173 A | | 2/2012 |
| JP | 2012-038521 A | | 2/2012 |
| JP | 2012-043694 A | | 3/2012 |
| JP | 2012-079630 A | | 4/2012 |
| JP | 2013-001916 A | | 1/2013 |

OTHER PUBLICATIONS

Machine Translation of JP 2012038521 A. (Year: 2012).*
Machine Translation of JP 2010075880 A. (Year: 2010).*
Li et al. "The Recycling of Spent Lithium-Ion Batteries: a Review of Current Processes and Technologies". Electrochemical Energy Reviews (2018) 1:461-482. (Year: 2018).*
Machine translation of CN 101172677 A. (Year: 2008).*
Office Action issued in corresponding Japanese Patent Application No. 2019-215409, dated Sep. 19, 2023, w/ English Translation.

\* cited by examiner

*Primary Examiner* — Coris Fung
*Assistant Examiner* — Catriona M Corallo
(74) *Attorney, Agent, or Firm* — Rimon P.C.

(57) ABSTRACT

A separation and extraction method includes immersing a battery in water comprising sodium chloride and a polypeptide. The sodium chloride can facilitate discharge of the battery and the polypeptide can collect substances from the battery. After the battery is taken out of the water, the method may further include pulverizing the battery, sorting metal materials from the pulverized battery; and re-immersing the sorted metal material in the water.

3 Claims, 9 Drawing Sheets

| ELAPSED TIME [HOUR] | | 0 | 1 | 2 | 3 | 4 | 5 | 6 | 7 | 8 |
|---|---|---|---|---|---|---|---|---|---|---|
| WATER (SAMPLE A) | MEASUREMENT LOCATION X | 52V | 52V | 52V | 44V | 34V | 25V | 17V | 14V | 12V |
| | MEASUREMENT LOCATION Y | 52V | 52V | 52V | 10V | 8V | 6V | 5V | 13V | 11V |
| WATER + PG (SAMPLE B) | MEASUREMENT LOCATION X | 52V | 45V | 52V | 48V | 40V | 32V | 30V | 23V | 17V |
| | MEASUREMENT LOCATION Y | 52V | 45V | 52V | 50V | 44V | 36V | 24V | 18V | 13V |

| ELAPSED TIME [HOUR] | | 0 | 1 | 2 | 3 | 4 | 5 | 6 | 7 | 8 |
|---|---|---|---|---|---|---|---|---|---|---|
| WATER + NaCl (SAMPLE C) | MEASUREMENT LOCATION X | 38V | 1.6V | 1.5V | 0.8V | 0.8V | 0.6V | 0.7V | 0.8V | 0.6V |
| | MEASUREMENT LOCATION Y | 38V | 2.0V | 2.0V | 1.3V | 1.2V | 1.0V | 1.1V | 0.9V | 0.8V |
| WATER + NaCl + PG (SAMPLE D) | MEASUREMENT LOCATION X | 52V | 1.0V | 0.6V | 0.9V | 0.7V | 0.6V | 0.6V | 0.6V | 0.6V |
| | MEASUREMENT LOCATION Y | 52V | 2.6V | 1.7V | 1.3V | 1.2V | 1.1V | 1.1V | 1.1V | 1.0V |

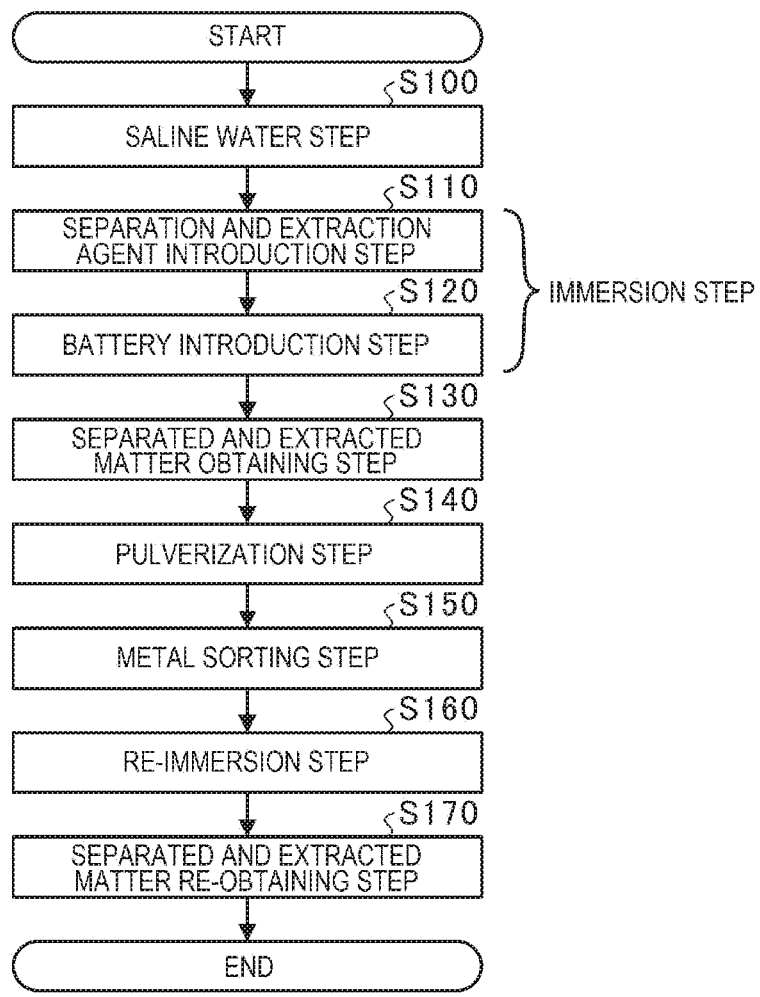

SEPARATION AND EXTRACTION METHOD AND BATTERY IMMERSION MIXTURE

CROSS-REFERENCE TO RELATED APPLICATIONS

The present application claims priority from Japanese Patent Application No. 2019-215409 filed on Nov. 28, 2019, the entire contents of which are hereby incorporated by reference.

The disclosure relates to a separation and extraction method and a battery immersion mixture that make it possible to recover valuables from a battery.

A battery, such as a lithium ion battery and a nickel hydrogen battery, is mounted on an electric vehicle and a hybrid electric vehicle so as to supply power to drive wheels. When an original charging and discharging function of the battery is degraded due to a service life and other factors, the battery is collected as exhausted. As the use of electric vehicles and hybrid electric vehicles becomes widespread, a large number of exhausted batteries are generated (see, for example, Japanese Unexamined Patent Application Publication No. 2013-1916).

SUMMARY

An aspect of the disclosure provides a separation and extraction method. The method includes immersing a battery in water containing a polypeptide.

An aspect of the disclosure provides a battery immersion mixture in which a battery is to be immersed. The mixture includes water and a polypeptide.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 3A is a table illustrating the measurement result. FIG. 3B is a graph illustrating the measurement result.

FIG. 4A is a table illustrating the measurement result. FIG. 4B is a graph illustrating the measurement result.

FIG. 5 is a flowchart illustrating a flow of the separation and extraction method according to the first embodiment.

FIG. 6A illustrates the saline water step. FIG. 6B illustrates a separation and extraction agent introduction step. FIG. 6C and FIG. 6D illustrate a battery introduction step. FIG. 6E illustrates the separated and extracted matter obtaining step.

FIG. 7A illustrates the pulverization step. FIG. 7B illustrates a metal sorting step. FIG. 7C and FIG. 7D illustrate a re-immersion step. FIG. 7E illustrates the separated and extracted matter re-obtaining step.

FIG. 9A illustrates the saline water step. FIG. 9B illustrates the battery introduction step. FIG. 9C and FIG. 9D illustrate the separation and extraction agent introduction step. FIG. 9E illustrates the separated and extracted matter obtaining step.

DETAILED DESCRIPTION

A battery includes various valuables, such as lithium and nickel. Therefore, in some cases, various valuables are recovered from an exhausted battery. As a method of recovering valuables from an exhausted battery, a method of pulverizing the battery and thereafter sorting metal material to recover valuables may be given as an example. However, when the battery in a power-stored state is pulverized, an electric shock may occur. For this reason, the power-stored battery is coupled to a load such as a light bulb and discharged before pulverized. However, by this method, it takes time to discharge the battery.

It is desirable to provide a separation and extraction method and a battery immersion mixture that make it possible to recover valuables from a battery while discharging the battery quickly.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
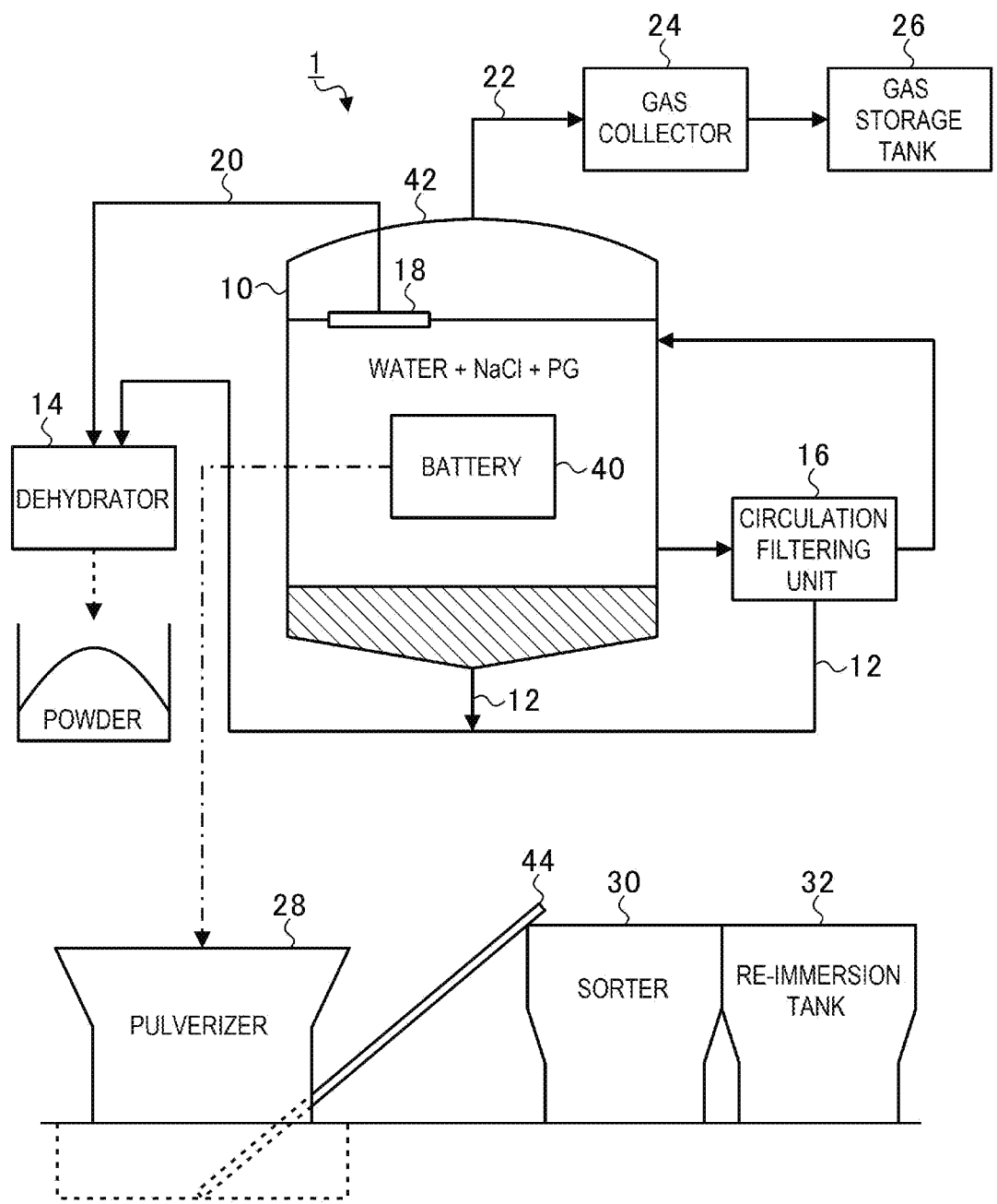
FIG. 1 is a schematic diagram illustrating a configuration of a separation and extraction system to perform a separation and extraction method according to a first embodiment.

FIG. 1 is a schematic diagram illustrating a configuration of a separation and extraction system 1 to perform a separation and extraction method according to a first embodiment. The configuration and processing related to the first embodiment will be described in detail below, but the description of configuration and processing unrelated to the first embodiment will be omitted.

A battery, such as a lithium ion battery and a nickel hydrogen battery, is mounted on an electric vehicle, a hybrid electric vehicle, and other vehicles so as to supply power to drive wheels. A voltage of the battery is, for example, 100 V or higher. When an original charging and discharging function of the battery is degraded due to a service life and other factors, the battery is collected as exhausted. The separation and extraction system 1 is a system to recover various valuables from the battery that has been collected as exhausted.

The separation and extraction system. 1 includes a separation and extraction tank 10, a sediment collection pipe 12, a dehydrator 14, a circulation filtering unit 16, a suspended matter obtainer 18, a suspended matter collection pipe 20, a gas collection pipe 22, a gas collector 24, a gas storage tank 26, a pulverizer 28, a sorter 30, and a re-immersion tank 32.

The separation and extraction tank 10 is a hollow container. The separation and extraction tank 10 contains water, sodium chloride, and a polypeptide. That is, the water in the separation and extraction tank 10 contains the sodium chloride and the polypeptide. The water in the separation and extraction tank 10 has normal temperature, for example. As used herein, the normal temperature is 20° C. ±a predetermined temperature. The predetermined temperature is set in a range of 5° C. to 15° C., for example.

The polypeptide is, for example, polyglutamic acid. In the following description, the polypeptide is polyglutamic acid. In FIG. 1, NaCl represents the sodium chloride, and PG represents the polyglutamic acid, which is an example of the polypeptide.

In some cases, an exhausted battery is collected in a power-stored (charged) state. For this reason, in recovering valuables from the exhausted battery, the battery is to be discharged until the battery has a predetermined voltage or lower to avoid an electric shock by the battery. The predetermined voltage corresponds to a reference for determination as to discharge completion. The predetermined voltage may be, for example, substantially the same as a voltage of a battery for an auxiliary device (e.g., 13V) or substantially the same as a voltage of a dry cell (e.g., 2 V).

As illustrated in FIG. 1, an exhausted battery 40 in the separation and extraction system 1 is accommodated in the separation and extraction tank 10 and immersed in the water in the separation and extraction tank 10. The battery 40 is accommodated to be wholly immersed in the water. However, the battery 40 may be partly immersed. In this case, the battery 40 is accommodated in such a manner that at least both terminals exposed outside are immersed. The battery 40 may be directly placed on a bottom surface of the separation and extraction tank 10 or placed on an intervening support such as a platform in the separation and extraction tank 10. In FIG. 1, illustration of the support is omitted.

A vertically upper portion of the separation and extraction tank 10 is covered with an openable cover 42. When the cover 42 is opened, the battery 40 can be put into or taken out of the separation and extraction tank 10. When the cover 42 is closed, the separation and extraction tank 10 can be hermetically closed. It is noted that the water, sodium chloride, and polyglutamic acid may be introduced into the separation and extraction tank 10 via the cover 42 or via another inlet.

Hereinafter, a mixture of the water and the polypeptide in which the battery 40 is immersed will be occasionally referred to as battery immersion mixture. The battery immersion mixture may include the water, the polypeptide, and the sodium chloride. The polypeptide of the battery immersion mixture is, for example, the polyglutamic acid. That is, in the separation and extraction system 1, the separation and extraction tank 10 contains the battery immersion mixture and the battery 40.

When the battery 40 is immersed in the water in the separation and extraction tank 10, the water short-circuits the terminals of the battery 40. Consequently, the battery 40 is discharged through the water.

The water in the separation and extraction tank 10 contains the sodium chloride. That is, the water is saline water, which is an aqueous solution in which the sodium chloride is dissolved. The saline water has the saturation concentration, for example. The saline water has higher electric conductivity than water with no sodium chloride dissolved therein. Consequently, the battery 40 is discharged more quickly through the water containing the sodium chloride (saline water).

Figure 2:
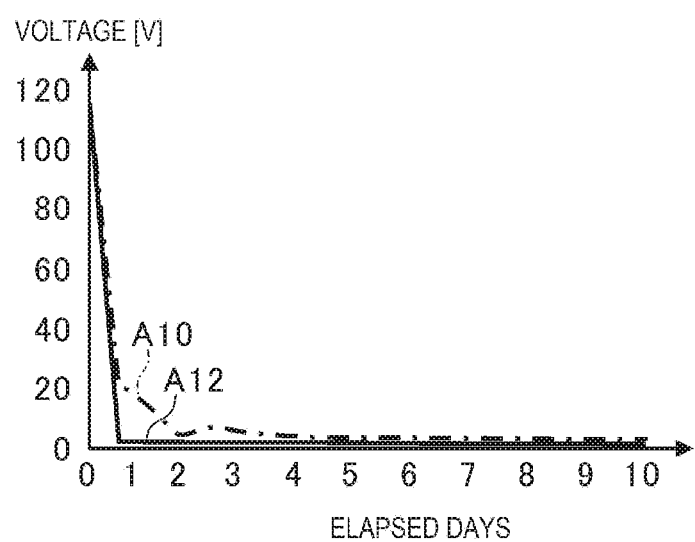
FIG. 2 is a graph illustrating exemplary transitions of voltage of an immersed battery.

FIG. 2 is a graph illustrating exemplary transitions of voltage of the immersed battery 40. A single chain line A10 indicates a transition of voltage of the battery 40 immersed in water containing no sodium chloride. A solid line A12 indicates a transition of voltage of the battery 40 immersed in water containing the sodium chloride.

As indicated by the single chain line A10 in FIG. 2, it takes approximately 48 hours to cause the voltage of the battery 40 immersed in the water containing no sodium chloride to be equal to or less than the predetermined voltage (a voltage at which it is determined that discharge has been completed) although the time may vary depending on a storage capacity of the battery 40. In contrast, as indicated by the solid line A12 in FIG. 2, it takes 24 hours or less to cause the voltage of the battery 40 immersed in the water containing the sodium chloride to be equal to or less than the predetermined voltage (the voltage at which it is determined that discharge has been completed) although the time may vary depending on the storage capacity.

In both of the case of immersing the battery 40 in the water and the case of immersing the battery 40 in the saline water, a voltage of the separation and extraction tank 10 while the battery 40 is immersed is notably low. Therefore, even when a person touches the separation and extraction tank 10 while the battery 40 is immersed, the person suffers no electric shock. That is, the battery 40 can be discharged safely.

Referring back to FIG. 1, when the battery 40 is immersed in the water, the water permeates into the battery 40 through, for example, a gap in a casing of the battery 40. As a result, lithium and other various constituent substances in the battery 40 are precipitated into the water. Precipitate that has been precipitated into the water is suspended or sedimented in the water depending on the kind of the precipitate. The precipitate may include a substance ionized by the water or may include a substance newly generated by hydrolysis reaction with the water.

As described above, the water in the separation and extraction tank 10 contains the polyglutamic acid. The polyglutamic acid functions to flocculate impurities in the water. For this reason, when the battery 40 is immersed in the water containing the polyglutamic acid, the polyglutamic acid collects the precipitate that has been precipitated from the battery 40 into the water. Then, the polyglutamic acid that has collected the precipitate is consequently sedimented along with the precipitate. Therefore, the polyglutamic acid can collect even the precipitate suspended in the water and the ionized precipitate, and sediment the precipitate.

Hereinafter, substances thus sedimented will be occasionally referred to as sediment. The sediment may include not only the substances collected by the polyglutamic acid and consequently sedimented but also substances directly sedimented without being affected by the polyglutamic acid. In FIG. 1, the sediment is indicated by hatching.

The sodium chloride in the water does not hinder the polyglutamic acid from collecting and sedimenting the precipitate when the polyglutamic acid and the sodium chloride are contained in the water.

The precipitate from the battery 40 immersed in the water is precipitated intensively in short predetermined time from a start of immersion of the battery 40. Then, when the predetermined time has elapsed, precipitation of the precipitate is substantially ended. Although the predetermined time may vary depending on the kind and the size of the battery 40, the predetermined time is, for example, approximately 10 hours. When the discharge is completed and when precipitation of the precipitate is substantially ended, the battery 40 is taken out of the separation and extraction tank 10.

Figures 3A, 3B:
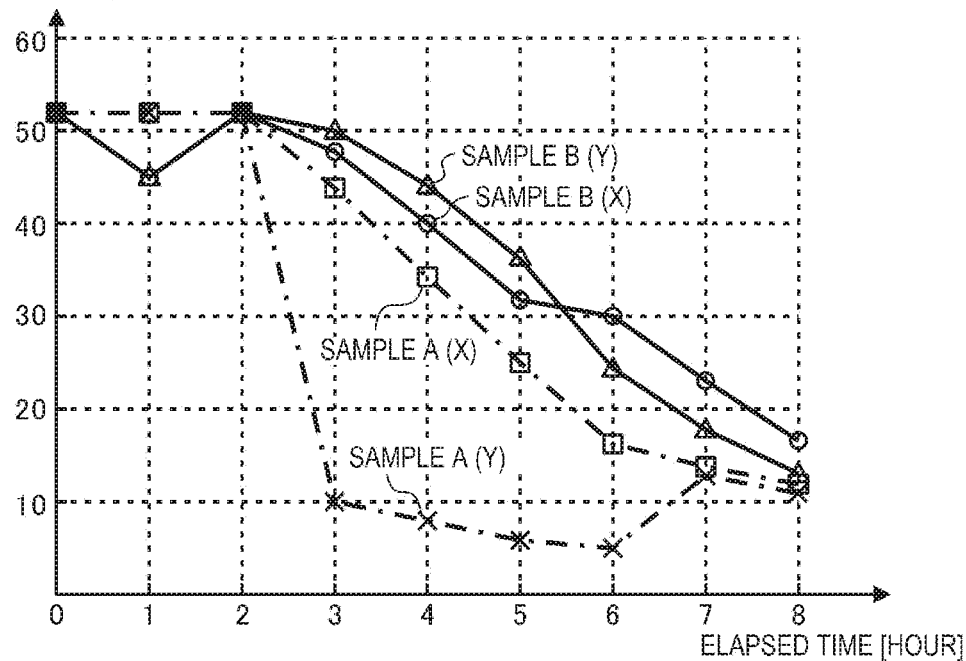
FIG. 3A and FIG. 3B illustrate an exemplary measurement result of a transition of voltage of the battery immersed in water containing no polyglutamic acid and a transition of voltage of the battery immersed in water containing polyglutamic acid.

The polyglutamic acid (PG) does not hinder the battery 40 from being discharged through the water. FIG. 3A and FIG. 3B illustrate an exemplary measurement result of a transition of voltage of the battery 40 immersed in water containing no polyglutamic acid and a transition of voltage of the battery 40 immersed in water containing the polyglutamic acid. FIG. 3A is a table illustrating the measurement result. FIG. 3B is a graph illustrating the measurement result. In FIG. 3A and FIG. 3B, 0 hour of elapsed time represents start time of immersing the battery 40. The elapsed time represents time from the start time of immersing the battery 40. Referring to FIG. 3A and FIG. 3B, the battery 40 immersed in water containing no polyglutamic acid will be occasionally referred to as sample A, and the battery 40 immersed in water containing the polyglutamic acid will be occasionally referred to as sample B. In FIG. 3B, square signs indicate a measurement result at a measurement location X of the sample A, and cross signs indicate a measurement result at a measurement location Y of the sample A, which is different from the measurement location X of the sample A. Circle signs indicate a measurement result at a measurement location X of the sample B, and triangle signs indicate a measurement result at a measurement location Y of the sample B.

As illustrated in FIG. 3A and FIG. 3B, at any of the measurement locations X and Y of the sample A and the measurement locations X and Y of the sample B, the voltage of the battery 40 starts to decrease when approximately 3 to 4 hours have elapsed after the immersion start, and the voltage tends to gradually decrease as time elapses. At any of the measurement locations X and Y of the sample A and the measurement locations X and Y of the sample B, the voltage of the battery 40 decreases to 20 V or less when 8 hours have elapsed after the immersion start.

In this manner, the battery 40 (sample B) immersed in the water containing the polyglutamic acid (water+PG) decreases in voltage in substantially the same manner as the battery 40 (sample A) immersed in the water (water) containing no polyglutamic acid. Thus, the polyglutamic acid does not hinder the battery 40 from being discharged through the water.

Figures 4A, 4B:
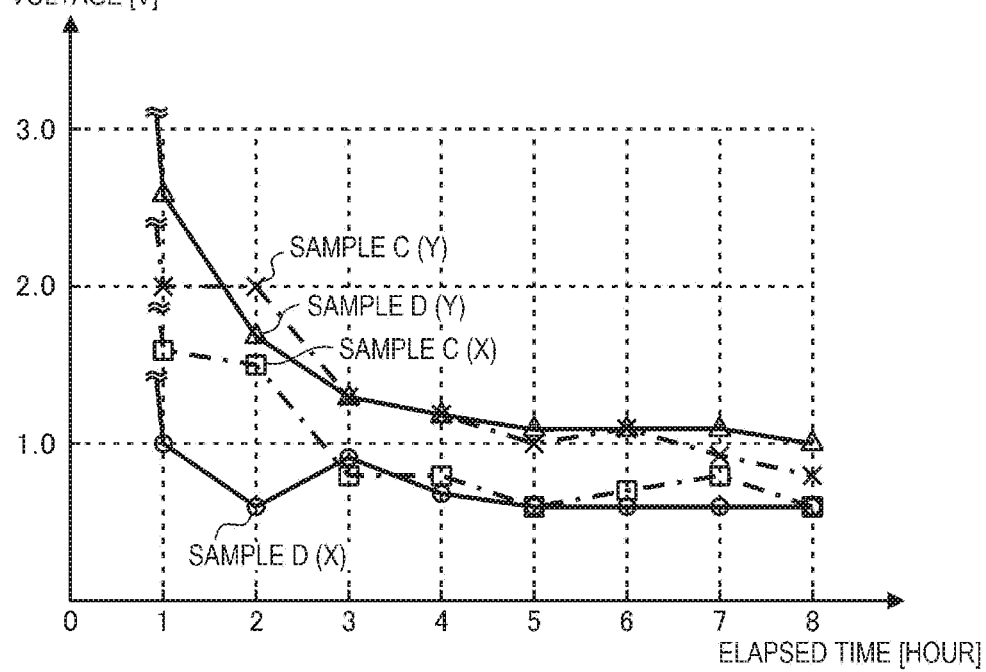
FIG. 4A and FIG. 4B illustrate an exemplary measurement result of a transition of voltage of the battery immersed in saline water containing no polyglutamic acid and a transition of voltage of the battery immersed in saline water containing the polyglutamic acid.

Furthermore, even when the polyglutamic acid (PG) is contained in water (saline water) containing sodium chloride (NaCl), the polyglutamic acid (PG) does not hinder the battery from being discharged through the water (saline water) containing the sodium chloride. FIG. 4A and FIG. 4B illustrate an exemplary measurement result of a transition of voltage of the battery 40 immersed in saline water containing no polyglutamic acid and a transition of voltage of the battery 40 immersed in saline water containing the polyglutamic acid. FIG. 4A is a table illustrating the measurement result. FIG. 4B is a graph illustrating the measurement result. In FIG. 4A and FIG. 4B, 0 hour of elapsed time represents start time of immersing the battery 40. The elapsed time represents time from the start time of immersing the battery 40. Referring to FIG. 4A and FIG. 4B, the battery 40 immersed in saline water containing no polyglutamic acid will be occasionally referred to as sample C, and the battery 40 immersed in saline water containing the polyglutamic acid will be occasionally referred to as sample D. In FIG. 4B, square signs indicate a measurement result at a measurement location X of the sample C, and cross signs indicate a measurement result at a measurement location Y of the sample C, which is different from the measurement location X of the sample C. Circle signs indicate a measurement result at a measurement location X of the sample D, and triangle signs indicate a measurement result at a measurement location Y of the sample D.

As illustrated in FIG. 4A and FIG. 4B, the sample C and the sample D have a difference in initial voltage of the battery 40. However, at any of the measurement locations X and Y of the sample C and the measurement locations X and Y of the sample D, the voltage of the battery 40 sharply decreases to 3 V or less when 1 hour has elapsed after the immersion start. At any of the measurement locations X and Y of the sample C and the measurement locations X and Y of the sample D, when 1 hour or more has elapsed after the immersion start, the voltage tends to gradually decrease as time elapses. At any of the measurement locations X and Y of the sample C and the measurement locations X and Y of the sample D, the voltage of the battery 40 decreases to 1.0 V or less when 8 hours have elapsed after the immersion start.

In this manner, the battery 40 (sample D) immersed in the saline water containing the polyglutamic acid (water+NaCl+PG) decreases in voltage in substantially the same manner as the battery 40 (sample C) immersed in the saline water (water+NaCl) containing no polyglutamic acid. Thus, the polyglutamic acid does not hinder the battery 40 from being discharged through the saline water.

Referring back to FIG. 1 again, the sediment collection pipe 12 is coupled to a vertically lower portion of the separation and extraction tank 10. The sediment collection pipe 12 is coupled to the dehydrator 14. The sediment generated in the separation and extraction tank 10 is sent to the dehydrator 14 via the sediment collection pipe 12.

The circulation filtering unit 16 is coupled to the separation and extraction tank 10 at a position vertically above the sediment. The circulation filtering unit 16 includes, for example, an intake pump and a filter. The intake pump of the circulation filtering unit 16 obtains water vertically above the sediment in the separation and extraction tank 10. This water includes the polyglutamic acid and the precipitate. As described above, the polyglutamic acid collects and sediments the precipitate. However, when the collected precipitate is not flocculated to have a specific gravity enough to be sedimented, the collected precipitate is not sedimented but suspended in the water. The filter of the circulation filtering unit 16 separates, from the obtained water, the precipitate collected by the polyglutamic acid. Thus, the obtained water is filtered. The filtered water is returned to the separation and extraction tank 10. Hereinafter, the precipitate and the polyglutamic acid separated by the circulation filtering unit 16 will be occasionally referred to as filtration residue.

The sediment collection pipe 12 is coupled to the circulation filtering unit 16. The filtration residue is sent to the dehydrator 14 via the sediment collection pipe 12.

The suspended matter obtainer 18 is located on a surface of the water in the separation and extraction tank 10. The suspended matter obtainer 18 is coupled to the suspended matter collection pipe 20. The suspended matter collection pipe 20 is coupled to the dehydrator 14. The suspended matter obtainer 18 draws in by suction the precipitate suspended on the surface of the water. The precipitate drawn in is sent to the dehydrator 14 via the suspended matter collection pipe 20.

The dehydrator 14 is, for example, a centrifuge. The dehydrator 14 removes moisture from the sediment, the filtration residue, and the suspended matter thus obtained. As a result, particulate powder from which the moisture has been removed is obtained. The powder includes variables such as lithium in the battery 40.

Thus, in the separation and extraction system 1, valuables can be separated, extracted, and recovered from the battery 40. Although not elaborated here, an existing sorting technique suited to each kind of the valuables may be applied to the powder.

The gas collection pipe 22 is coupled to a vertically upper portion (such as the cover 42) of the separation and extraction tank 10. The gas collection pipe 22 is coupled to the gas collector 24. When the battery 40 is immersed in the water, a gas such as hydrogen fluoride is generated. The gas generated in the separation and extraction tank 10 is sent to the gas collector 24 via the gas collection pipe 22. The gas collector 24 separates a variable gas such as hydrogen fluoride from air. The gas storage tank 26 is coupled to the gas collector 24. The gas storage tank 26 stores the gas separated by the gas collector 24.

The battery 40 taken out of the separation and extraction tank 10 is conveyed to the pulverizer 28. The pulverizer 28 includes, for example, a pair of rollers opposed to each other. The pulverizer 28 uses the pair of rollers to mechanically pulverize the battery 40. The pulverized battery 40 is conveyed to the sorter 30 by a component such as a belt conveyor 44.

The sorter 30 sorts the pulverized battery 40 into metal material and plastic material using a vibrating screen method, for example. However, a sorting method is not limited to the vibrating screen method but may be a sorting method utilizing a difference in specific gravity, for example.

The re-immersion tank 32 is, for example, a container rotatable about a vertical axis. The re-immersion tank 32 contains water, polyglutamic acid, which is an example of the polypeptide, and the metal material sorted by the sorter 30. The re-immersion tank 32 rotates about the vertical axis to stir the polyglutamic acid and the metal material in the water. Thus, remaining precipitate that has not been precipitated in the separation and extraction tank 10 is precipitated from the metal material into the water. When the precipitate is precipitated from the metal material, the precipitate is collected by the polyglutamic acid.

When rotation of the re-immersion tank 32 is ended, the precipitate collected by the polyglutamic acid is sedimented. Sediment and the metal material are taken out of the water and sorted. The sediment obtained by the re-immersion tank 32 is, for example, dehydrated and turned into powder by the dehydrator 14.

FIG. 5 is a flowchart illustrating a flow of the separation and extraction method according to the first embodiment. As illustrated in FIG. 5, in the separation and extraction method, a saline water step (S100), a separation and extraction agent introduction step (S110), a battery introduction step (S120), and a separated and extracted matter obtaining step (S130) are performed in sequence. Thereafter, a pulverization step (S140), a metal sorting step (S150), a re-immersion step (S160), and a separated and extracted matter re-obtaining step (S170) are performed in sequence to end a series of processing. In the separation and extraction method, the separation and extraction agent introduction step (S110) and the battery introduction step (S120) will be collectively referred to as immersion step in some cases.

Figure 6A:
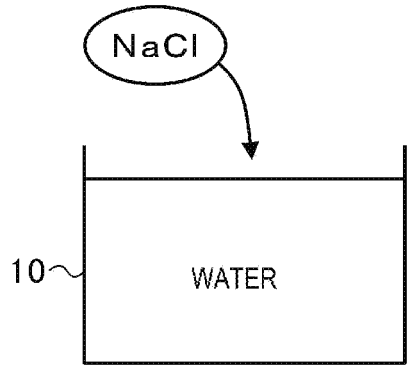
FIG. 6A to FIG. 6E are conceptual diagrams illustrating a saline water step to a separated and extracted matter obtaining step in the separation and extraction method.
Figure 6B:
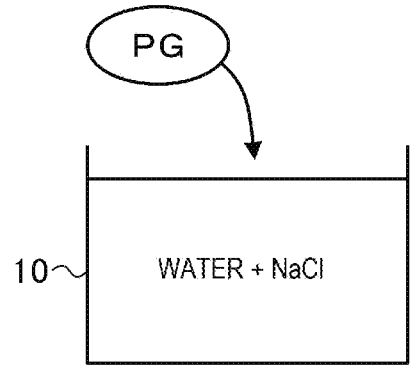
Figure 6C:
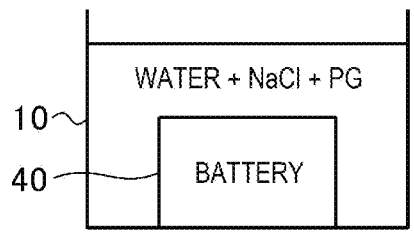
Figure 6D:
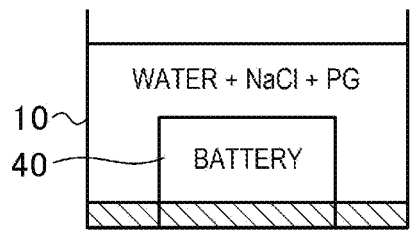
Figure 6E:
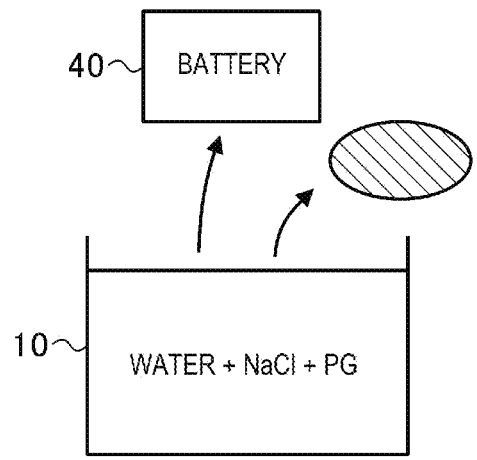

FIG. 6A to FIG. 6E are conceptual diagrams illustrating the saline water step to the separated and extracted matter obtaining step in the separation and extraction method. FIG. 6A illustrates the saline water step. FIG. 6B illustrates the separation and extraction agent introduction step. FIG. 6C and FIG. 6D illustrate the battery introduction step. FIG. 6E illustrates the separated and extracted matter obtaining step. It is noted that in FIG. 6A to FIG. 6E, in substantially the same manner as in FIG. 1, NaCl represents the sodium chloride, and PG represents the polyglutamic acid.

As illustrated in FIG. 6A, prior to the saline water step, the separation and extraction tank 10 contains water. At the saline water step, sodium chloride is introduced into the water in the separation and extraction tank 10. The saline water step is performed to make the water in the separation and extraction tank 10 contain the sodium chloride.

As illustrated in FIG. 6B, in the separation and extraction agent introduction step, the polyglutamic acid is introduced into the water in the separation and extraction tank 10. The polyglutamic acid is an example of the polypeptide to function as a separation and extraction agent. The separation and extraction agent introduction step is performed to make the water in the separation and extraction tank 10 contain the polyglutamic acid. That is, both of the saline water step and the separation and extraction agent introduction step are performed to make the water contain both of the sodium chloride and the polyglutamic acid.

It is noted that in this example, the separation and extraction agent introduction step is performed after the saline water step. However, the saline water step is to be performed at least prior to the battery introduction step. The saline water step may be performed after the separation and extraction agent introduction step or at the same time as the separation and extraction agent introduction step. The saline water step may be omitted.

As illustrated in FIG. 6C, in the battery introduction step, the battery 40 is introduced into the water after the separation and extraction agent introduction step. That is, in the immersion step including the separation and extraction agent introduction step and the battery introduction step, the battery 40 is immersed in the water at least containing the polyglutamic acid, which is an example of the polypeptide. In this method, the saline water step is performed prior to the battery introduction step so that when the battery introduction step is performed, the battery 40 is immersed in the water containing both of the polyglutamic acid, which is an example of the polypeptide, and the sodium chloride.

As illustrated in FIG. 6D, when the battery 40 is immersed by performing the battery introduction step, the battery 40 is discharged through the water containing the sodium chloride. When the battery 40 is immersed by performing the battery introduction step, precipitate is precipitated from the battery 40 into the water, and the precipitate is collected by the polyglutamic acid and sedimented. In FIG. 6D, the sediment is indicated by hatching.

When predetermined time has elapsed after the start of the battery introduction step, the separated and extracted matter obtaining step is performed. The predetermined time is set based on completion time of discharge of the battery 40 and precipitation end time of the precipitate. That is, after it is determined that the battery 40 has been sufficiently discharged, and that the precipitate has been sufficiently sedimented, the separated and extracted matter obtaining step is performed.

As illustrated in FIG. 6E, in the separated and extracted matter obtaining step, sediment is taken out of the water in the separation and extraction tank 10. The sediment is separated and extracted matter. In FIG. 6E, the sediment (separated and extracted matter) taken out of the water is indicated by hatching. For example, the sediment is taken out via the sediment collection pipe 12. Moreover, in the separated and extracted matter obtaining step, the battery 40 is taken out of the water in the separation and extraction tank 10. For example, the cover 42 is opened to take out the battery 40.

Figure 7A:
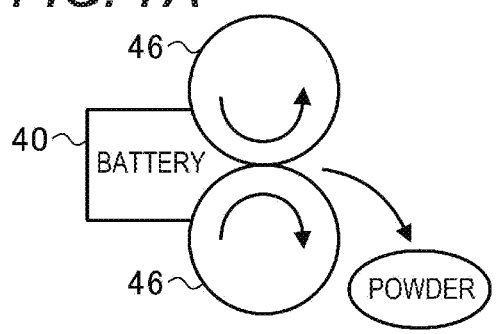
FIG. 7A to FIG. 7E are conceptual diagrams illustrating a pulverization step to a separated and extracted matter re-obtaining step in the separation and extraction method.
Figure 7B:
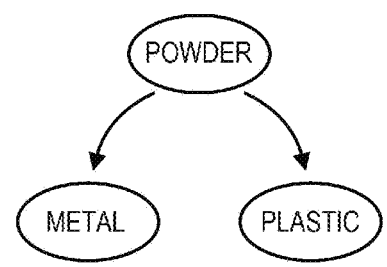
Figure 7C:
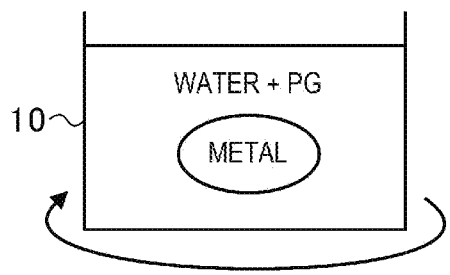
Figure 7D:
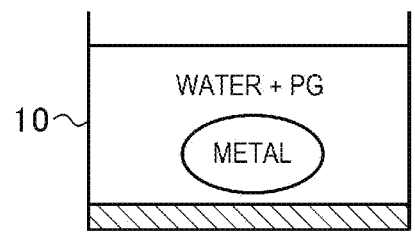
Figure 7E:
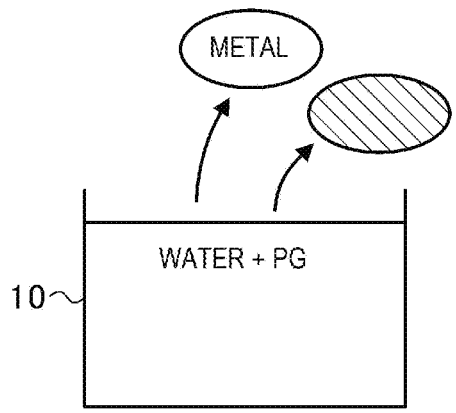

FIG. 7A to FIG. 7E are conceptual diagrams illustrating the pulverization step to the separated and extracted matter re-obtaining step in the separation and extraction method. FIG. 7A illustrates the pulverization step. FIG. 7B illustrates the metal sorting step. FIG. 7C and FIG. 7D illustrate the re-immersion step. FIG. 7E illustrates the separated and extracted matter re-obtaining step. It is noted that in FIG. 7A to FIG. 7E, in substantially the same manner as in FIG. 1, PG represents the polyglutamic acid.

As illustrated in FIG. 7A, in the pulverization step, the battery 40 taken out of the water after the immersion step is pulverized. In the pulverization step, in the pulverizer 28, for example, the battery 40 is held between a pair of rollers 46 that rotate in directions reverse to each other so as to pulverize the battery 40. The battery 40 is pulverized into powder.

As illustrated in FIG. 7B, in the metal sorting step, the powder resulting from pulverization of the battery 40 is sorted into metal material and plastic material by the sorter 30. That is, in the metal sorting step, metal material is sorted out of the battery 40 after pulverized. It is noted that an appropriate sorting method may be applied to each kind of plastic material sorted out so as to further sort out each kind of the plastic material.

As illustrated in FIG. 7C, in the re-immersion step, the metal material sorted out is immersed in water containing the polyglutamic acid, which is an example of the polypeptide, in the re-immersion tank 32. In the re-immersion step, the metal material and the polyglutamic acid in the water in the re-immersion tank 32 are then stirred for predetermined time. When the metal material is immersed in the re-immersion step, precipitate is precipitated from the metal material into the water, and the precipitate is collected by the polyglutamic acid. When the metal material and the polyglutamic acid are stirred in the water, precipitation of the precipitate from the metal material is promoted, and the precipitate becomes more likely to be collected by the polyglutamic acid.

As illustrated in FIG. 7D, at the re-immersion step, when stirring is ended, the precipitate collected by the polyglutamic acid is sedimented. In FIG. 7D, the sediment is indicated by hatching.

It is noted that in the re-immersion step, an example of stirring is given. However, in the re-immersion step, stirring may be omitted.

As illustrated in FIG. 7E, in the separated and extracted matter re-obtaining step, the sediment is taken out of the water in the re-immersion tank 32. The sediment is separated and extracted matter. In FIG. 7E, the sediment (separated and extracted matter) taken out of the water is indicated by hatching. The sediment taken out is dehydrated and turned into powder.

In the separated and extracted matter re-obtaining step, metal material is taken out of the water in the re-immersion tank 32. An appropriate sorting method may be applied to each kind of the metal material taken out so as to further sort out each kind of the metal material.

As described above, the separation and extraction method according to the first embodiment includes the immersion step of immersing the battery 40 in the water containing the polypeptide. Therefore, the separation and extraction method according to the first embodiment makes it possible to precipitate valuables contained in the battery 40 into the water and collect the valuables. Since the battery 40 is immersed in the water, the separation and extraction method according to the first embodiment makes it possible to facilitate and quicken discharge of the battery 40 without hindering collection of the precipitate from the battery 40.

Consequently, with the separation and extraction method according to the first embodiment, while the battery 40 is discharged quickly, the valuables can be recovered from the battery 40. Moreover, with the separation and extraction method according to the first embodiment, discharge of the battery 40 and recovery of the valuables can be performed at the same time. The separation and extraction method according to the first embodiment makes it possible to avoid an electric shock by the battery 40. Furthermore, the separation and extraction method according to the first embodiment makes it possible to simplify equipment for discharge of the battery 40 and recovery of the valuables.

In the separation and extraction method according to the first embodiment, the battery 40 is introduced into the water after the polypeptide is introduced into the water. Consequently, with the separation and extraction method according to the first embodiment, collection of the precipitate from the battery 40 and discharge of the battery 40 can be performed simultaneously from the start of immersion of the battery 40. As a result, the separation and extraction method according to the first embodiment makes it possible to complete recovery of the valuables from the battery 40 more quickly.

In the separation and extraction method according to the first embodiment, the battery 40 is immersed in the water containing the sodium chloride. Therefore, the separation and extraction method according to the first embodiment makes it possible to complete discharge of the battery 40 more quickly without hindering collection of the precipitate from the battery 40.

In the separation and extraction method according to the first embodiment, the battery 40 after undergoing the immersion step is pulverized, and the metal material sorted out of the pulverized battery 40 is immersed in the water containing the polypeptide. This is equivalent to re-collection of precipitate from the battery 40. Therefore, the separation and extraction method according to the first embodiment makes it possible to promote recovery of the valuables from the battery 40 in an improved manner.

In the separation and extraction method according to the first embodiment, the precipitate from the battery 40 is collected as the sediment, the gas generated from the battery 40 is collected by the gas collector 24, and the battery 40 after precipitation of the precipitate is pulverized, sorted out, and re-immersed to be collected so that all of the valuables of the battery 40 can be recovered.

The battery immersion mixture according to the first embodiment includes the water containing the polypeptide, in which the battery 40 is immersed. Consequently, with the battery immersion mixture according to the first embodiment, in substantially the same manner as the above-described separation and extraction method, while the battery 40 is discharged quickly, the valuables can be recovered from the battery 40.

The battery immersion mixture according to the first embodiment further includes the sodium chloride. This makes it possible to complete discharge of the battery 40 more quickly.

Second Embodiment

Figure 8:
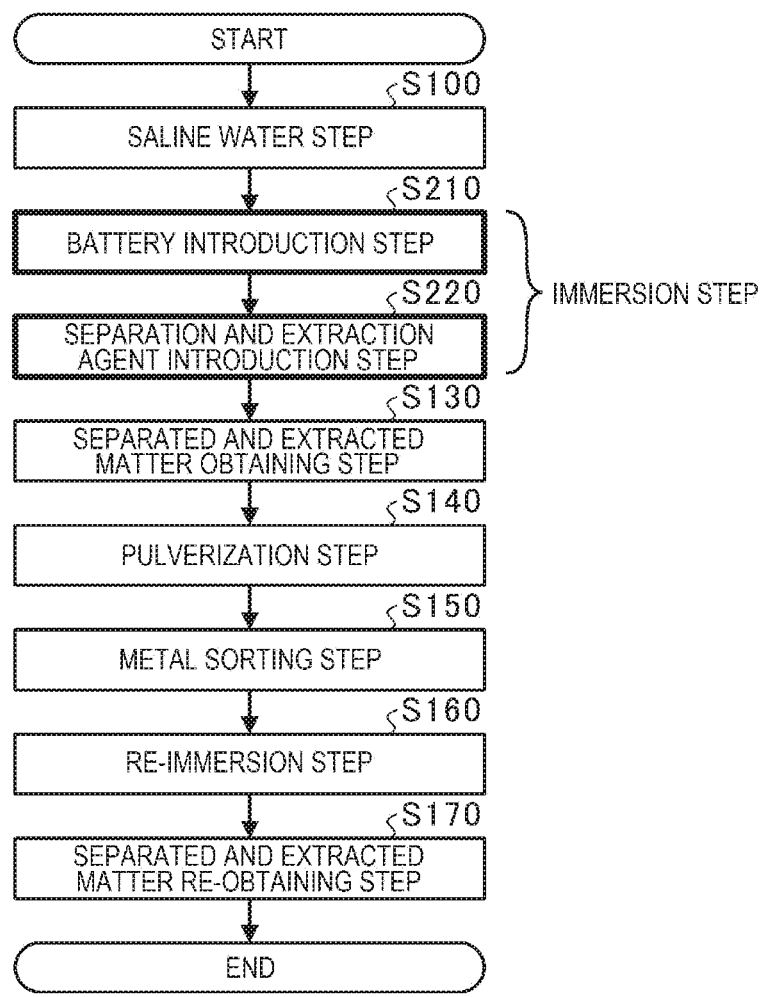
FIG. 8 is a flowchart illustrating a flow of a separation and extraction method according to a second embodiment.

FIG. 8 is a flowchart illustrating a flow of a separation and extraction method according to a second embodiment. As illustrated in FIG. 8, in the separation and extraction method according to the second embodiment, a battery introduction step (S210) is performed after the saline water step (S100), a separation and extraction agent introduction step (S220) is performed after the battery introduction step (S210), and the separated and extracted matter obtaining step (S130) is performed after the separation and extraction agent introduction step (S220). That is, the separation and extraction method according to the second embodiment is different from the separation and extraction method according to the first embodiment in that the battery introduction step (S210) and the separation and extraction agent introduction step (S220) are performed in reverse order. In the following, description of steps in common with the steps according to the first embodiment will be omitted, and different steps will be detailed. In the second embodiment as well, the battery introduction step (S210) and the separation and extraction agent introduction step (S220) will be collectively referred to as immersion step in some cases.

Figure 9A:
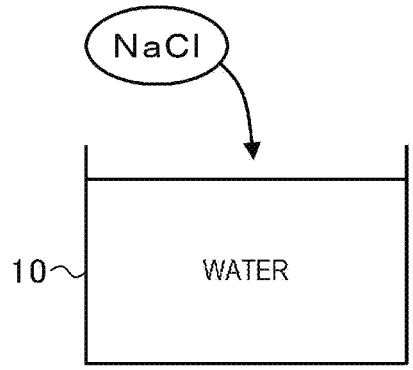
FIG. 9A to FIG. 9E are conceptual diagrams illustrating the saline water step to the separated and extracted matter obtaining step in the separation and extraction method according to the second embodiment.
Figure 9B:
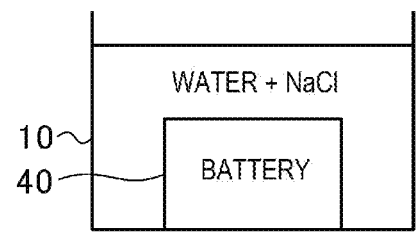
Figure 9C:
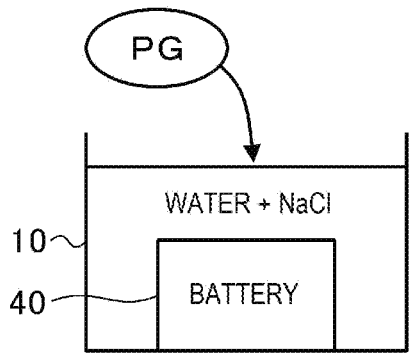
Figure 9D:
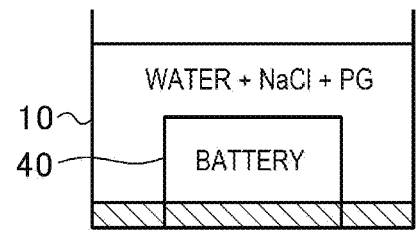
Figure 9E:
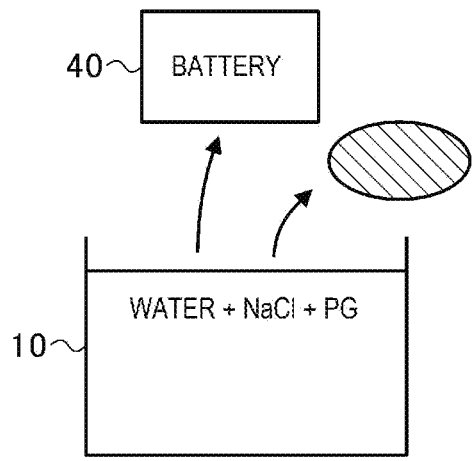

FIG. 9A to FIG. 9E are conceptual diagrams illustrating the saline water step to the separated and extracted matter obtaining step in the separation and extraction method according to the second embodiment. FIG. 9A illustrates the saline water step. FIG. 9B illustrates the battery introduction step. FIG. 9C and FIG. 9D illustrate the separation and extraction agent introduction step. FIG. 9E illustrates the separated and extracted matter obtaining step.

As illustrated in FIG. 9A, in the saline water step, sodium chloride is introduced into the water in the separation and extraction tank 10. The saline water step is performed to make the water in the separation and extraction tank 10 contain the sodium chloride.

As illustrated in FIG. 9B, in the battery introduction step after the saline water step, the battery 40 is introduced into the water containing the sodium chloride. When the battery 40 is immersed by performing the battery introduction step, the battery 40 is discharged through the water containing the sodium chloride. When the battery 40 is immersed by performing the battery introduction step, precipitate is precipitated from the battery 40 into the water.

As illustrated in FIG. 9C, in the separation and extraction agent introduction step after the battery introduction step, with the battery 40 being immersed in the water containing the sodium chloride, the polyglutamic acid, which is an example of the polypeptide, is introduced into the water. That is, in the second embodiment, after the battery 40 is introduced into the water, the polypeptide is introduced into the water. The separation and extraction agent introduction step is performed to make the water contain the polyglutamic acid in addition to the sodium chloride.

Then, when the separation and extraction agent introduction step is performed, as illustrated in FIG. 9D, the precipitate that has been precipitated into the water is collected by the polyglutamic acid and sedimented. When predetermined time has elapsed after performing the separation and extraction agent introduction step, the separated and extracted matter obtaining step is performed.

As illustrated in FIG. 9E, in the separated and extracted matter obtaining step, sediment and the battery 40 are taken out of the water in the separation and extraction tank 10. The sediment is the separated and extracted matter.

It is noted that in the separation and extraction method according to the second embodiment, the separation and extraction agent introduction step may be performed after completing discharge of the battery 40 or the separation and extraction agent introduction step may be performed during discharge of the battery 40.

As described above, the separation and extraction method according to the second embodiment includes the immersion step of immersing the battery 40 in the water containing the polypeptide. Therefore, with the separation and extraction method according to the second embodiment, in substantially the same manner as the first embodiment, the battery 40 can be discharged easily and quickly, and also, the valuables contained in the battery 40 can be precipitated into the water and collected.

Thus, with the separation and extraction method according to the second embodiment, in substantially the same manner as the first embodiment, while the battery 40 is discharged quickly, the valuables can be recovered from the battery 40. In substantially the same manner as the first embodiment, the separation and extraction method according to the second embodiment makes it possible to avoid an electric shock by the battery 40 and to simplify the equipment. In the separation and extraction method according to the second embodiment, when the separation and extraction agent introduction step is performed during discharge of the battery 40, discharge of the battery 40 and recovery of the valuables can be performed simultaneously.

In the separation and extraction method according to the second embodiment, with the precipitate being sufficiently precipitated in the water, the polypeptide can be introduced into the water. Consequently, the separation and extraction method according to the second embodiment makes it possible to complete collection of the precipitate quickly.

Moreover, in the separation and extraction method according to the second embodiment, the battery 40 is immersed in the water containing the sodium chloride so that discharge of the battery 40 can be completed more quickly.

It is noted that in the separation and extraction method according to the second embodiment, in substantially the same manner as the first embodiment, the re-immersion step may be performed. In this mode, recovery of the valuables from the battery 40 can be promoted in an improved manner. Furthermore, in substantially the same manner as the first embodiment, the separation and extraction method according to the second embodiment makes it possible to recover all of the valuables of the battery 40.

The battery immersion mixture may be generated by introducing the polyglutamic acid, which is an example of the polypeptide, into the water where the battery 40 is immersed. That is, formation of the battery immersion mixture is not limited to the formation before immersing the battery 40 therein, but the battery immersion mixture may be generated with the battery 40 being immersed therein.

In the mode of adding the sodium chloride to the battery immersion mixture, even when the battery immersion mixture is generated after immersion of the battery 40, the sodium chloride is added to the water that constitutes the battery immersion mixture prior to immersion of the battery 40. This makes it possible to implement the effect of shortening discharge time of the battery 40 by the sodium chloride in an appropriate manner.

The embodiments of the disclosure have been described heretofore with reference to the accompanying drawings. It is noted that the disclosure is not limited to such embodiments. It will be apparent to those skilled in the art that various changes and modifications to the embodiments can be conceived within the scope of the appended claims, and it is to be understood that such changes and modifications also belong to the technical scope of the disclosure.

In each of the above-described embodiments, the polyglutamic acid is given as an example of the polypeptide to function as the separation and extraction agent. However, the separation and extraction agent is not limited to the polyglutamic acid. Other polypeptide having a flocculating function may be employed as the separation and extraction agent.

In each of the above-described embodiments, a temperature of the water in the separation and extraction tank 10 is set at normal temperature. However, the temperature of the water in the separation and extraction tank 10 is not limited to normal temperature. The water in the separation and extraction tank 10 is at least kept liquid, and the temperature of the water may be higher than normal temperature, for example. As the temperature of the water in the separation and extraction tank 10 is increased, completion of discharge of the battery 40 and completion of collection of the precipitate can be quickened.

In each of the above-described embodiments, in the saline water step, the saline water has the saturation concentration. However, the concentration of the saline water is not limited to the saturation concentration but may be a concentration at a level of seawater, for example. It is noted that as the concentration of sodium chloride increases, completion of discharge of the battery 40 can be quickened.

In each of the above-described embodiments, the battery 40 mounted on a vehicle such as an electric vehicle is an object of the separation and extraction method. However, the object of the separation and extraction method is not limited to the battery 40 aboard a vehicle but maybe the battery 40 to operate electronic equipment, for example. In each of the above-described embodiments, a lithium ion battery and a nickel hydrogen battery are given as examples of the battery 40 as the object of the separation and extraction method. However, the battery 40 as the object of the separation and extraction method may be of other kinds.

The invention claimed is:

1. A separation and extraction method comprising:
   immersing a battery in a solution comprising sodium chloride and a polypeptide;
   facilitating, by the sodium chloride, discharge of the battery while collecting, by the polypeptide, substances released from the battery;
   separating and extracting the substances as suspended matters on the solution surface, precipitates in the solution and sediments in the solution; and
   collecting hydrogen fluoride generated by the immersing the battery in the solution.

2. The separation and extraction method according to claim 1, further comprising:
   pulverizing the battery taken out of the solution after the immersing;
   sorting metal material from the pulverized battery; and
   re-immersing the sorted metal material in the solution comprising the polypeptide.

3. The separation and extraction method according to claim 1, wherein the polypeptide is polyglutamic acid.

* * * * *